United States Patent
Traverso et al.

[11] Patent Number: 5,580,916
[45] Date of Patent: Dec. 3, 1996

[54] VULCANIZABLE COMPOSITIONS OF NITRILE RUBBERS

[75] Inventors: Enrico Traverso, Monza; Franco Rivetti, Milan; Lucio Spelta, Casalpusterlengo, all of Italy

[73] Assignee: Enichem, Synthesis S.p.A., Palermo, Italy

[21] Appl. No.: 209,108

[22] Filed: Mar. 9, 1994

[30] Foreign Application Priority Data

Mar. 10, 1993 [IT] Italy .................. MI93A0458

[51] Int. Cl.$^6$ .................. C08K 5/109
[52] U.S. Cl. .................. 524/281; 524/83; 524/280; 524/128; 524/495; 524/451; 524/492; 524/449
[58] Field of Search .................. 524/83, 280, 281, 524/282, 128, 495, 451, 492, 449

[56] References Cited

U.S. PATENT DOCUMENTS

| | | | |
|---|---|---|---|
| 2,758,975 | 8/1956 | Cottle et al. | 252/49.8 |
| 4,131,731 | 12/1978 | Lai et al. | 528/370 |
| 4,146,522 | 3/1979 | Heckles | 260/29.1 R |
| 4,599,370 | 7/1986 | Grossman et al. | 523/200 |
| 5,219,979 | 6/1993 | Greco | 528/220 |

*Primary Examiner*—Paul R. Michl
*Assistant Examiner*—U. K. Rajguru
*Attorney, Agent, or Firm*—George P. Hoare, Jr.; Rogers & Wells

[57] ABSTRACT

A description follows of vulcanizable compositions of nitrile rubbers containing a plasticizer, a vulcanizing agent and normal additives, wherein the plasticizer is an organic carbonate selected from those which can be defined with the formula (I):

$$X-R-O-\underset{O}{\underset{\|}{C}}-O-(R-O-\underset{O}{\underset{\|}{C}}-O)_{\overline{n}}R-X \qquad (I)$$

or with the formula (II):

$$R^2-C(CH_2-O-\underset{O}{\underset{\|}{C}}-O-R^1)_3 \qquad (II)$$

wherein R, $R^1$, $R^2$, X and n are as defined in the description.

10 Claims, No Drawings

VULCANIZABLE COMPOSITIONS OF NITRILE RUBBERS

FIELD OF THE INVENTION

The present invention relates to vulcanizable compositions of nitrile rubbers which contain an organic carbonate as plasticizer.

BACKGROUND OF THE INVENTION

Nitrile rubbers (NBR rubbers) are products of the copolymerization of 1,3-butadiene and acrylonitrile, generally having an acrylonitrile content within the range of 15 to 50% by weight. According to the known art, these rubbers are formulated with plasticizers, cross-linking agents, normal fillers and additives and subjected to vulcanization to give end-products whose characteristics widely depend on the composition of the NBR rubber. In particular, in vulcanized products the values of resistance to liquid fuels and solvents, and the resistance to abrasion and permeability of gases, increase with the increase of the acrylonitrile content. On the other hand, with a decrease in the acrylonitrile content the characteristics at low temperature and resilience improve. These vulcanized products are consequently used in technological fields which require high performances, such as the car industry, the manufacture of gaskets, piping and oil seals. For a review of NBR rubbers, their production, formulation and vulcanization, reference can be made to Kirk-Othmer, Encyclopedia of Chemical Technology, Ed. 1982, Vol. 8, page 184 onwards and Vol. 20, page 365 onwards.

The functions of the plasticizers used in vulcanizable compositions of NBR rubbers basically consist in increasing the performance of the formulate at low temperatures, improving the workability in relation to the different transformation and moulding techniques, lowering the cost of the formulate, in that the addition of the plasticizer enables a greater quantity of fillers to be incorporated, and modifying the resistance to solvents of the vulcanized products.

A group of plasticizers, for general use, which are suitable for the purpose, is that of dialkyl esters of phthalic acid. When specific characteristics are required, aliphatic plasticizers are used, which are relatively more valuable, such as the dialkyl esters of adipic acid, sebacic acid (for example di-2-ethyl-hexylsebacate, DOS) and azelaic acid, or the polymeric esters of said acids, in particular adipic acid, especially when vulcanized products are required which are particularly resistant and impermeable to the action of oils and solvents.

The disadvantage of the above plasticizers basically consists in their high cost and consequently the necessity is felt in the art for more economical plasticizers.

DETAILED DESCRIPTION OF THE INVENTION

It has now been found, in accordance with the present invention, that particular organic carbonates, which will be defined later on, operate as plasticizers for NBR rubbers, with a performance which is at least the same as that of aliphatic dialkyl esters of the known art. These plasticizing organic carbonates are obtained from raw materials which are widely available and economical, by simple transesterification reactions. In this way, the demands for low costs mentioned above are fully satisfied.

In accordance with this, the present invention relates to a vulcanizable composition of nitrile rubber containing a plasticizer, vulcanizing agent and normal additives, wherein said plasticizer is:

(A) an organic carbonate plasticizer selected from those which can be defined with the formula (I):

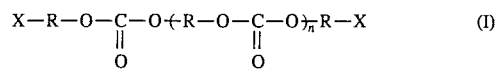   (I)

wherein: each R is independently selected from:
alkylene groups, linear or branched, containing from 1 to 20 carbon atoms;
oxydialkylene groups: -R'O-R"-,
sulphodialkylene groups: -R'-S-R"-,
oxodialkylene groups:

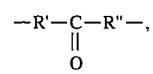

carboxydialkylene groups:

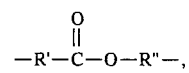

cycloalkylene groups: -R'-A-R"-,
wherein A is a cycloalkylene containing 5 or 6 carbon atoms, and R' and R" are each independently an alkylene group, linear or branched, containing from 1 to 10 carbon atoms;
X is hydrogen or hydroxyl; and
n is a number from 1 to 50; or (B) an organic carbonate plasticizer selected from those which can be defined with the formula (II):

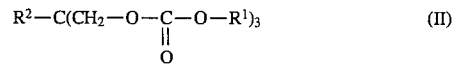   (II)

wherein: $R^1$ has the meaning of R-X of formula (I), with X=hydrogen, and
$R^2$ is hydrogen, an alkyl group, linear or branched containing from 1 to 20 carbon atoms, or the group:

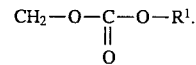

In the preferred embodiment, in formula (I):
each R independently represents:
alkylene groups, linear or branched, with from 4 to 10 carbon atoms;
carboxydialkylene groups:

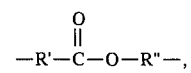

wherein R' and R" independently represent linear alkylene groups containing from 4 to 6 carbon atoms;
X is hydrogen or hydroxyl; and
n varies from 1 to 20.
Again in the preferred embodiment, in formula (II):
$R^1$ is an alkyl group, linear or branched, containing from 3 to 10 carbon atoms, and
$R^2$ is hydrogen, an alkyl group containing from 1 to 4 carbon atoms, or the group:

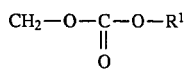

Specific examples of organic carbonates (I) are:
bis (ethylhexylcarbonate) of 1,4-butanediol;
bis (ethylhexylcarbonate) of 1,6-hexanediol;
bis (ethylhexylcarbonate) of 3-methyl-1,5-pentanediol
the organic carbonate known under the trade-name of Ravecarb 107 of Enichem Synthesis, as defined in the experimental part;
the organic carbonate known under the trade-name of Ravecarb 111 of Enichem Synthesis, as defined in the experimental part.

Specific examples of organic carbonate (II) are:
tetrakis (butylcarbonate) of pentaerythritol, and
tris (2-ethylhexylcarbonate) of trimethylol-propane.

The organic carbonates (I) and (II) of the present invention are viscous liquids, with a viscosity at room temperature of about 20 to about 50,000 cSt, with a number average molecular weight generally ranging from 300 to 5,000 and preferably from 400 to 3,000 and a slip point lower than $-10°$ C.

The organic carbonates useful for the purposes of the present invention can be prepared starting from alkyl carbonates and diols or polyols, operating under transesterification conditions, in the presence of a transesterification catalyst. Examples of suitable alkyl carbonates are dimethylcarbonate, diethylcarbonate, diallylcarbonate, dibutylcarbonate and di-2-ethylhexylcarbonate. Examples of suitable diols and polyols are 1,4-butanediol, 1,5-pentanediol, 1,6-hexanediol, 3-methyl-1,5-pentanediol, neopentylic glycol, 1,4-cyclohexanedimethanol, trimethylolpropane and pentaerythritol. Examples of suitable catalysts are sodium hydroxide, sodium methylate, trialkyl aluminates, tetraalkyl titanates, dialkyl stannanes of organic acids, and tin salts, oxides and alkoxides. In the transesterification reaction a molar ratio between alkyl carbonate and diol or polyol of about 1:1 to about 15:1 can be used and the reaction is carried out at high temperatures, for example at temperatures of about 160°–210° C. At the end of the reaction the organic carbonates (I) or (II) are recovered from the reaction mixture using the conventional and known methods.

The preparation of organic mono- and polycarbonates, and their used in lubricant compositions, is widely described in patent literature, for example in U.S. Pat. No. 2.758.975 and Belgian patent 764.900 and in European patent applications publication 421.298 and 426.153. There are few descriptions on the other hand of the use of organic carbonates as plasticizers for polymeric materials. In particular the patent GB 750.505 discloses the use of $C_{13}$ oxocarbonates as plasticizers in rubbers of the isobutylene-isoprene type and in rubbers of the styrene-butadiene type (SBR rubbers). U.S. Pat. No. 3.269.971 describes the use of dialkylcarbonates, with $C_8$–$C_{20}$ alkyl as plasticizers for polycarbonates. Finally U.S. Pat. No. 4.403.056 describes the use of alkylphenyl carbonates as plasticizers for polyvinylchloride. It should be noted however that dialkyl carbonates, or carbonates which can be defined with the formula:

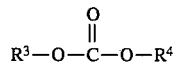

wherein $R^3$ and $R^4$ represent alkyl or aryl groups, are not suitable as plasticizers for the purposes of the present invention as they are not very compatible with nitrile rubbers.

The vulcanizable compositions of the present invention therefore contain:
an NBR rubber, produced from the copolymerization of 1,3-butadiene and acrylonitrile, with a content of acrylonitrile within the range of 15 to 50% by weight; the NBR rubber may possibly be mixed with other polymers such as polyvinylchloride or an ethylene/propylene/diene elastomer;

an organic carbonate plasticizer (I) or (II), as defined above, in a quantity of about 4 to 50 parts by weight for every 100 parts by weight of NBR rubber;

a vulcanizing agent composed of sulphur, or sulphur-donor compounds, or an organic peroxide, typically used in a quantity of about 0.1 or about 3 parts by weight for every 100 parts by weight of NBR rubber;

a vulcanization activator, for example zinc oxide and stearic acid, typically used in a quantity of about 1 to about 5 parts by weight for every 100 parts by weight of NBR rubber; and a vulcanizing accelerator, for example thiozole, sulphenamides, thioureas, guanidines, dithiocarbamates, disulphide thiurams and aldehyde amine condensates, typically used in a quantity of about 0.2 to about 5 parts by weight for every 100 parts by weight of NBR rubber.

The vulcanizable compositions may also contain:
antioxidants and age-inhibitors, for example aromatic amines, sterically hindered phenols, phosphites and sterically hindered amines, typically used in a quantity of about 2 parts by weight for every 100 parts by weight of NBR rubber;

reinforcing fillers, for example carbon black, caolin, talc, silica, silicates and mica, typically used in a quantity of up to about 100 parts by weight for every 100 parts by weight of NBR rubber; and various ingredients, for example peptizing agents, lubricants, pigments and dyes.

These compositions can be vulcanized using the conventional techniques, by mixing the components at temperatures which can generally vary from room temperature to about 180° C., in suitable equipment such as a Banbury mixer, and vulcanizing with compression moulding at temperatures of about 150° C., or with injection moulding at temperatures of about 200° C.

The experimental examples which follow provide a better illustration of the present invention.

EXAMPLE 1

Preparation of bis(2-ethylhexylcarbonate) of 1,4-butanediol.

The following products are charged into a 3 liter flask, equipped with a distillation column with 20 perforated plates, having a cooler, separator/divider and collector, and with an electromagnetic stirrer, and connected to a vacuum pump:
58.5 g (0.65 moles) of 1,4-butanediol
1,859 g (6.5 moles) of 2-ethylhexylcarbonate
0.5 g of sodium methylate in a solution at 30% in methanol.

Operating at a residual pressure of 12-9 torr., with a temperature at the bottom of 165°–210° C. and at the head of 77°–72° C., and with a reflux ratio of 1.5, the transesterification is completed in about 1.5 hours, collecting 168 g of 2-ethylhexanol at the head.

The solid bottom product (1,750 g) is treated with carbon dioxide to completely carbonate the catalyst and is then filtered on dicalite. The filtrate is distilled twice with a LEYBOLD KDL1 fine film still, under the following operating conditions:

| temperature of heating oil | 180° C. |
|---|---|
| residual pressure | 1 torr. |
| rate of stirrer | 400 revs/min |
| feeding rate | 12 ml/min |

188 g of distillation residue were obtained composed of bis(ethylhexylcarbonate) of 1,4-butanediol:

$$H_{17}C_8-O-\underset{O}{\overset{\parallel}{C}}-O[(CH_2)_4-O-\underset{O}{\overset{\parallel}{C}}-O]_n-C_8H_{17}$$

containing about 80% by weight of bis(ethylhexylcarbonate) of 1,4-butanediol (corresponding to the above formula with n=1), about 15% by weight of higher oligomers, corresponding to the above formula with n>1, and about 5% by weight of di-ethylhexylcarbonate, as determined by gas-liquid chromatography.

The product also has the following characteristics:

| viscosity at 40° C. | 20.14 cSt |
|---|---|
| viscosity at 100° C. | 4.04 cSt |
| viscosity index | 97 |
| pour point | < –50° C. |

EXAMPLE 2

Preparation of bis (2-ethylhexylcarbonate) of 1,6-hexanediol.

The same procedure is carried out as for example 1, charging into the flask: 59 g (0.5 moles) of 1,6-hexanediol, 1,718 g (6 moles) of 2-ethylhexylcarbonate and 0.5 g of sodium methylate in a solution at 30% in methanol.

The following transesterification conditions are applied:

| residual pressure | 10 torr. |
|---|---|
| temperature at the bottom | 190° C. |
| temperature at the head | 70° C. |
| reflux ratio | 1 |
| reaction time | 1 hour. |

130 g of 2-ethylhexanol are collected.

The solid bottom product after treatment with carbon dioxide, is filtered and distilled as in example 1.

163 g of bis(ethylhexylcarbonate) of 1,6-hexanediol were obtained:

$$H_{17}C_8-O-\underset{O}{\overset{\parallel}{C}}-O[(CH_2)_6-O-\underset{O}{\overset{\parallel}{C}}-O]_n-C_8H_{17}$$

containing about 86% by weight of bis (ethylhexylcarbonate) of 1,6-hexanediol (corresponding to the above formula with n=1), about 10% by weight of higher oligomers, corresponding to the above formula with n>1, and about 4% by weight of di-ethylhexylcarbonate, as determined by gas-liquid chromatography.

The product also has the following characteristics:

| viscosity at 40° C. | 24.5 cSt |
|---|---|
| viscosity at 100° C. | 4.7 cSt |
| viscosity index | 110 |
| pour point | < –33° C. |

EXAMPLE 3

Preparation of tris (2-ethylhexylcarbonate) of trimethylolpropane

The same procedure is carried out as in example 1 charging into the flask: 50 g (0.37 moles) of trimethylolpropane, 1,602 g (5.6 moles) of 2-ethyl-hexylcarbonate and 0.5 g of sodium methylate in solution at 30% in methanol.

The following transesterification conditions are applied:

| residual pressure | 10–20 torr. |
|---|---|
| temperature at the bottom | 172–186° C. |
| temperature at the head | 90–70° C. |
| reflux ratio | 1 |
| reaction time | 1.5 hours. |

144 g of 2-ethylhexanol are collected.

The solid bottom product after treatment with carbon dioxide, is filtered and distilled twice in a film still, under the following conditions:

| temperature of heating oil | 200° C. |
|---|---|
| residual pressure | 0.7 torr. |
| rate of stirrer | 400 revs/min |
| feeding rate | 10 ml/min |

Tris(2-ethylhexylcarbonate of trimethylolpropane is thus obtained:

$$H_5C_2-C(CH_2-O-\underset{O}{\overset{\parallel}{C}}-O-C_8H_{17})_3$$

with a titer of 86% by weight, the remaining percentage basically being composed of oligomeric products as determined by gas-liquid chromatography.

The product obtained has the following characteristics:

| viscosity at 40° C. | 163.5 cSt |
|---|---|
| viscosity at 100° C. | 13.3 cSt |
| viscosity index | 97 |
| pour point | –30° C. |

EXAMPLES 4–12

Compositions are prepared, containing nitrile rubber and plasticizer, as shown table 1 below.

TABLE 1

| Composition | 4 | 5 | 6 | 7 | 8 | 9 | 10 | 11 | 12 |
|---|---|---|---|---|---|---|---|---|---|
| Europrene | 100 | 100 | 100 | 100 | 100 | 100 | 100 | 100 | 100 |
| ZnO | 3 | 3 | 3 | 3 | 3 | 3 | 3 | 3 | 3 |
| Stearic ac. | 1 | 1 | 1 | 1 | 1 | 1 | 1 | 1 | 1 |

TABLE 1-continued

| Composition | 4 | 5 | 6 | 7 | 8 | 9 | 10 | 11 | 12 |
|---|---|---|---|---|---|---|---|---|---|
| Carbon black | 50 | 50 | 50 | 50 | 50 | 50 | 50 | 50 | 50 |
| Plast. DOS | 10 | — | — | — | — | — | — | — | — |
| Plast. A | — | 10 | — | — | — | — | — | — | — |
| Plast. B | — | — | 10 | — | — | — | — | — | — |
| Plast. C | — | — | — | 10 | — | — | — | — | — |
| Plast. D | — | — | — | — | 10 | — | — | — | — |
| Plast. E | — | — | — | — | — | 10 | — | — | — |
| Plast. F | — | — | — | — | — | — | 10 | — | — |
| Plast. G | — | — | — | — | — | — | — | 10 | — |
| SR 1000 | — | — | — | — | — | — | — | — | 10 |
| TMTD | 2.8 | 2.8 | 2.8 | 2.8 | 2.8 | 2.8 | 2.8 | 2.8 | 2.8 |
| Sulphur | 0.2 | 0.2 | 0.2 | 0.2 | 0.2 | 0.2 | 0.2 | 0.2 | 0.2 |

In this table:

Europrene is the commercial product Europrene N 3345 of Enichem Elastomeri, an NBR rubber with an acrylonitrile content of 33% by weight and Mooney viscosity of 45±5;

Carbon black is the commercial product CORAX N330 of PCBI (Pittsburg Carbon Black Italia);

Plast. DOS is the plasticizer dioctylsebacate of the known art; example 4 is consequently a comparative example;

Plast. A is the plasticizer bis(ethylhexylcarbonate) of 1,4-butanediol, obtained in example 1;

Plast. B is the plasticizer bis(ethylhexylcarbonate) of 1,6-hexanediol, obtained in example 2;

Plast. C is the commercial plasticizer Ravecarb 107 of Enichem Synthesis, which can be defined with the formula:

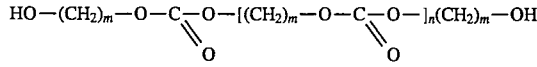

wherein $(CH_2)_m$ indicates a mixture of 1,5-pentylene and 1,6-hexylene in a ratio between them of 42/58; having a number average molecular weight of 1,850, hydroxyl number of 64.4 (mg KOH/mg), viscosity (25° C.) of 45,000 cSt and a glass transition temperature (Tg) of −52° C.;

Plast. D is the commercial plasticizer Ravecarb 111 of Enichem Synthesis, which can defined with the formula:

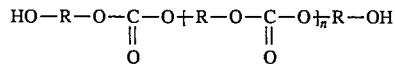

wherein: R indicates the radical

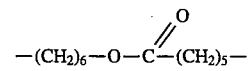

and having a number average molecular weight of 2,000, hydroxyl number of 56.1 (mg KOH/mg), viscosity (25° C.) of 12,000 cSt and glass transition temperature (Tg) of −64° C.;

Plast. E is the plasticizer tris(2-ethylhexylcarbonate) of trimethylolpropane;

Plast. F is the plasticizer tetrakis(butylcarbonate) of pentaerythritol;

Plast. G is the plasticizer bis(2-ethylhexylcarbonate) of 3-methyl-1,5-pentandiol;

SR 1000 is a commercial dialkyl carbonate with $C_{12}$–$C_{15}$ alkyl groups, of Enichem Synthesis, example 12 is consequently a comparative example;

TMTD is the commercial product MERAMID TMTD (tetramethylthiuramdisulphide) of Enichem Synthesis.

Table 2 below shows the Mooney viscosity values of compositions 4 to 12, determined according to ASTM D 1646.

TABLE 2

| Composition | 4 | 5 | 6 | 7 | 8 | 9 | 10 | 11 | 12 |
|---|---|---|---|---|---|---|---|---|---|
| ML COMP. | 42 | 43 | 45 | 51 | 53 | 46 | 47 | 45 | 44 |

Table 3 below shows the reactivity values of compositions 4 to 12, at 121° C., according to ASTM D 1646. In this table MV=minimum "torque" value; T5 and T35 are the times where there is an increase in "torque", with respect to MV, of 5 and 35 points respectively.

TABLE 3

| | SCORCHING ML 121° C. | | | | | | | | |
|---|---|---|---|---|---|---|---|---|---|
| Composit. | 4 | 5 | 6 | 7 | 8 | 9 | 10 | 11 | 12 |
| MV lb.inch | 29.5 | 29 | 31.5 | 34 | 35 | 31.4 | 32.5 | 30.5 | 30 |
| T5 min. | 16.2 | 17.9 | 17.0 | 17.4 | 17.7 | 17.5 | 17.1 | 18.6 | 18.75 |
| T35 min. | 26.3 | 29.8 | 28.0 | 28.3 | 29.2 | 29.3 | 28 | 32 | 31.5 |

Table 4 below shows the vulcanization rheometry values of the compositions, according to ASTM D 2084; in this table ML is the minimum rheometric "torque" value, MH the maximum rheometric "torque" value, and T90 indicates the time which corresponds to a MH-ML difference of 90%.

TABLE 4

| MONSANTO O.D.R. RHEOMETRIES 100S 160° C., 60', ±1° C. | | | | | | | | | |
|---|---|---|---|---|---|---|---|---|---|
| Comp. | 4 | 5 | 6 | 7 | 8 | 9 | 10 | 11 | 12 |
| ML lb.inch | 3.4 | 4.1 | 3.9 | 4.9 | 5.1 | 4.2 | 4.3 | 4.3 | 4.8 |
| MH lb.inch | 24.8 | 26.6 | 26.1 | 32.1 | 31.1 | 23.5 | 28.8 | 27.3 | 19.8 |
| Ts1 min. | 2.4 | 2.5 | 2.5 | 2.4 | 2.4 | 2.5 | 2.45 | 2.6 | 2.5 |
| T50 min. | 6.8 | 7.0 | 7.7 | 7.2 | 6.8 | 6.3 | 6.8 | 7.5 | 7.2 |
| T90 min. | 13.5 | 13.9 | 16.1 | 14.1 | 13.7 | 12 | 13.9 | 15.5 | 14.0 |

Table 5 below shows the values of the elastic-mechanical characteristics of the vulcanized compositions; in this table M100 and M300 are the moduli at 100% and 300% of elongation, C.R. is the breaking load and A.R. is the extensibility (ASTM D 412); in addition DUR. ShA indicates the hardness according to ASTM D 2240.

TABLE 5

| VULCANIZATION at 160° C. for 16 min. | | | | | | | | | |
|---|---|---|---|---|---|---|---|---|---|
| Comp. | 4 | 5 | 6 | 7 | 8 | 9 | 10 | 11 | 12 |
| M100 Mpa | 1.9 | 1.9 | 1.9 | 1.8 | 1.7 | 2 | 2.1 | 2.1 | 1.7 |
| M300 Mpa | 8.1 | 7.4 | 8.7 | 7.8 | 7.8 | 7.3 | 8.3 | 8.4 | 7.4 |
| C.R. Mpa | 20.1 | 18.7 | 21.1 | 22.3 | 22.1 | 18.1 | 18.3 | 19.2 | 17.8 |
| A.R. % | 565 | 585 | 580 | 645 | 645 | 530 | 550 | 560 | 550 |
| DUR.ShA | 61 | 60 | 61 | 61 | 60 | 61 | 61 | 60 | 59 |

Table 6 below shows the compression deformation values of the vulcanized products, according to ASTM D 395/B.

TABLE 6

| | COMPRESSION SET | | | | | | | | |
|---|---|---|---|---|---|---|---|---|---|
| Composition | 4 | 5 | 6 | 7 | 8 | 9 | 10 | 11 | 12 |
| 70 h, 120° C. % | 38.5 | 44 | 34 | 34 | 36 | 42 | 39 | 44 | 42.5 |

In Table 7 below, with TR-10 and TR-70 shows the retraction temperatures of 10% and 70% respectively of the elongated and frozen test sample (ASTM D 1329)

TABLE 7

| | TR-TEST | | | | | | | | |
|---|---|---|---|---|---|---|---|---|---|
| Compos. | 4 | 5 | 6 | 7 | 8 | 9 | 10 | 11 | 12 |
| TR-10° C. | −31.5 | −31.5 | −28.5 | −27.5 | −26.5 | −27 | −28 | −31 | −26.5 |
| TR-70° C. | −17.5 | −16.5 | −15.5 | −14 | −13.5 | −13 | −15 | −17 | −13.5 |

Tables 8, 9 and 10 below show the aging values in air according to ASTM D 573 and tables 11 and 12 the aging values in fluids according to ASTM D 471.

TABLE 8

| | AGING in AIR 24 h at 100° C. | | | | | | | | |
|---|---|---|---|---|---|---|---|---|---|
| Compos. | 4 | 5 | 6 | 7 | 8 | 9 | 10 | 11 | 12 |
| dCR % | −6 | −9 | 9 | 5 | 0 | −5 | 2 | 10 | 2 |
| dAR % | −24 | −28 | −19 | −22 | −22 | −20 | −24 | −15 | −26 |
| dShA p.ts | 4 | 5 | 5 | 4 | 4 | 2 | 4 | 3 | 5 |
| dP % | −1.1 | −1.2 | −1.1 | −1.1 | −1 | −1 | −1.6 | −1 | −1.3 |

TABLE 9

| | AGING IN AIR 70 h at 100° C. | | | | | | | | |
|---|---|---|---|---|---|---|---|---|---|
| Compos. | 4 | 5 | 6 | 7 | 8 | 9 | 10 | 11 | 12 |
| dCR % | −1 | 20 | 3 | 0 | 0 | 20 | 22 | 8 | 9 |
| dAR % | −33 | −30 | −32 | −38 | −39 | −22 | −24 | −31 | −37 |
| dShA p.ts | 7 | 7 | 7 | 6 | 7 | 3 | 6 | 6 | 9 |
| dP % | −1.6 | −1.7 | −1.4 | −1.5 | −1.4 | −1.5 | −2.5 | −1.3 | −1.9 |

TABLE 10

| | AGING in AIR 168 h at 100° C. | | | | | | | | |
|---|---|---|---|---|---|---|---|---|---|
| Compos. | 4 | 5 | 6 | 7 | 8 | 9 | 10 | 11 | 12 |
| dCR % | 6 | 3 | 6 | −10 | 2 | 20 | 17 | 8 | −20 |
| dAR % | −41 | −50 | −38 | −51 | −47 | −33 | −38 | −39 | −59 |
| dShA p.ts | 12 | 12 | 10 | 10 | 10 | 6 | 10 | 10 | 14 |
| dP | −2.1 | −2.2 | −1.7 | −1.8 | −1.5 | −2.1 | −2.6 | −1.5 | −2.1 |

TABLE 11

| | AGING in OIL ASTM N.3 70 h at 125° C. | | | | | | | | |
|---|---|---|---|---|---|---|---|---|---|
| Compos. | 4 | 5 | 6 | 7 | 8 | 9 | 10 | 11 | 12 |
| dCR % | −5 | −19 | 0 | −13 | −12 | −4 | −5 | −11 | −11 |
| dAR % | −25 | −40 | −25 | −32 | −32 | −31 | −31 | −31 | −32 |
| dShA p.ts | −4 | −3 | −5 | −8 | −7 | −4 | −4 | −3 | −4 |
| dV % | 8.5 | 8.5 | 9.5 | 16 | 16 | 10.5 | 10 | 8.5 | 9.5 |

TABLE 12

| | AGING IN FUEL C 70 h at R.T. | | | | | | | | |
|---|---|---|---|---|---|---|---|---|---|
| Compos. | 4 | 5 | 6 | 7 | 8 | 9 | 10 | 11 | 12 |
| dCR % | −70 | −66 | −71 | −74 | −74 | −68 | −69 | −65 | N.D. |
| dAR % | −59 | −55 | −60 | −64 | −64 | −55 | −60 | −50 | N.D. |
| dShA p.ts | −23 | −25 | −23 | −23 | −22 | −24 | −22 | −23 | N.D. |
| dV % | 53 | 51 | 55 | 62 | 63.5 | 62 | 54.5 | 52.5 | N.D. |

A comparison of examples 5 to 11 with example 4 shows the good behaviour of the organic carbonates of the present invention as plasticizers in a mixture based on nitrile rubber. In addition, depending on the composition of the mixture, some of the organic carbonates of the present invention have an improved performance in some of the conditions being examined. More specifically, examples 5 and 11 are quite close to example 4 used as reference (plasticizer DOS), and in particular example 11 shows that the vulcanized mixture has, with an equal resistance to low temperatures, a significantly higher thermal resistance. Examples 6, 7 and 9 moreover show that the respective organic carbonates give better thermal resistance to the vulcanized mixture, whereas examples 7 and 9 indicate that the corresponding organic carbonate plasticizers have a lesser tendency to be extracted from the vulcanized mixture by the action of the aggressive fluids with which they come into contact (oil ASTM no. 3 and FUEL C), with respect to the reference product (DOS). In addition, on comparing examples 5 to 11 with example 12, it can be noted that the dialkylcarbonates are not in themselves very suitable as plasticizers for nitrile rubbers, owing to their limited rheometric characteristics in vulcanization, mechanical properties and aging to air. Also in the case of example 12 there are signs of sweating and incompatibility of the dialkyl carbonate with respect to the elastomeric mass. The structure of organic carbonates (I) and (II)

are therefore critical for their use according to the present invention.

We claim:

1. Vulcanizable composition of nitrile rubbers containing a plasticizer, a vulcanizing agent and conventional additives, characterized in that said plasticizer is (A) an organic carbonate plasticizer selected from those which can be defined with the formula (I)

$$X-R-O-C(=O)-O-(R-O-C(=O)-O)_n-R-X \quad (I)$$

wherein each R is independently selected from alkylene groups, linear or branched, containing from 1 to 20 carbon atoms;

oxydialkylene groups -R'-O-R"-, sulphodialkylene groups: -R'-S-R"-, oxodialkylene groups $$-R'-C(=O)-R"-,$$

carboxydialkylene groups $$-R'-C(=O)-O-R"-,$$

cycloalkylene groups -R'-A-R"-, wherein A is a cycloalkylene containing 5 or 6 carbon atoms, and R' and R" are each independently an alkylene group, linear or branched, containing from 1 to 10 carbon atoms;

X is hydrogen or hydroxyl; and n is a number from 1 to 50; or (B) an organic carbonate plasticizer selected from those which can be defined with the formula (II)

$$R^2-C(CH_2-O-C(=O)-O-R^1)_3 \quad (II)$$

wherein: $R^1$ has the meaning of R-X of formula (I), with X=hydrogen, and $R^2$ is hydrogen, an alkyl group, linear or branched containing from 1 to 20 carbon atoms, or the group $$CH_2-O-C(=O)-O-R^1.$$

2. Composition according to claim 1, characterized in that in said formula (I)

each R independently represents alkylene groups, linear or branched, with from 4 to 10 carbon atoms;

carboxydialkylene groups $$-R'-C(=O)-O-R"-,$$

wherein R' and R" independently represent linear alkylene groups containing from 4 to 6 carbon atoms;

X is hydrogen or hydroxyl; and n varies from 1 to 20.

3. Composition according to claim 1, characterized in that in said formula (II)

$R^1$ is an alkyl group, linear or branched, containing from 3 to 10 carbon atoms, and $R^2$ is hydrogen, an alkyl group containing from 1 to 4 carbon atoms, or the group $$CH_2-O-C(=O)-O-R^1$$

4. Composition according to claims 1, characterized in that said organic carbonates (I) and (II) are viscous liquids, with a viscosity at room temperature of about 20 to 50,000 cSt, with a number average molecular weight generally ranging from 300 to 5,000 and pour point lower than −10° C.

5. Composition according to claim 1, characterized in that it contains said organic carbonates (I) or (II) in a quantity of about 4 to about 50 parts by weight for every 100 parts by weight of NBR rubber.

6. Composition according to claim 1, characterized in that it contains, as a vulcanizing agent, sulphur or donor compounds of sulphur, or an organic peroxide, in a quantity of about 0.1 to about 3 parts by weight for every 100 parts by weight of NBR rubber.

7. Composition according to claim 1, characterized in that it additionally contains: vulcanizing accelerators; antioxidants and age-inhibitors; reinforcing fillers; peptizing agents; lubricants; pigments and dyes.

8. Procedure for the preparation of vulcanized products of nitrile resins, comprising vulcanizing the composition according to claim 1.

9. Composition according to claim 7, wherein the vulcanizing accelerators are selected from the group consisting of thiazols, sulphenamides, thioureas, guanidines, dithiocarbamates, disulphide thiurams and aldehyde amine condensates; the antioxidants and age-inhibitors are selected from the group consisting of aromatic amines, sterically hindered phenols, phosphites and sterically hindered amines; and the reinforcing fillers are selected from the group consisting of carbon black, caolin, talc, silica, silicates and mica.

10. Composition according to claim 4 wherein the organic carbonates (I) and (II) have a number average molecular weight ranging from 400 to 3000.

* * * * *